(12) United States Patent
Hart et al.

(10) Patent No.: US 8,197,377 B2
(45) Date of Patent: Jun. 12, 2012

(54) AUTOMATIC TRANSMISSION GEAR AND CLUTCH ARRANGEMENT

(75) Inventors: James M. Hart, Belleville, MI (US); Andrew W. Phillips, Rochester, MI (US); Edwin T. Grochowski, Howell, MI (US); Elizabeth I. Wooden, Farmington Hills, MI (US); Scott H. Wittkopp, Ypsilanti, MI (US); James B. Borgerson, Clarkston, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 476 days.

(21) Appl. No.: 12/553,683

(22) Filed: Sep. 3, 2009

(65) Prior Publication Data

US 2011/0053725 A1     Mar. 3, 2011

(51) Int. Cl.
    *F16H 3/44* (2006.01)
(52) U.S. Cl. .................................. 475/286; 475/280

(58) Field of Classification Search .......... 475/275–291, 475/296, 330
See application file for complete search history.

(56) References Cited

U.S. PATENT DOCUMENTS

| 6,913,556 | B2 * | 7/2005 | Armstrong et al. | 475/269 |
|---|---|---|---|---|
| 7,846,058 | B2 * | 12/2010 | Kim | 475/280 |
| 8,105,196 | B2 * | 1/2012 | Portell et al. | 475/116 |
| 2003/0224900 | A1 * | 12/2003 | Sugiura et al. | 475/275 |
| 2007/0207891 | A1 * | 9/2007 | Gumpoltsberger | 475/280 |
| 2008/0182706 | A1 * | 7/2008 | Phillips et al. | 475/276 |
| 2008/0242485 | A1 * | 10/2008 | Carey et al. | 475/276 |
| 2008/0261756 | A1 * | 10/2008 | Carey et al. | 475/276 |
| 2009/0197733 | A1 * | 8/2009 | Phillips et al. | 475/276 |
| 2009/0247343 | A1 * | 10/2009 | Hart et al. | 475/31 |

* cited by examiner

*Primary Examiner* — Roger Pang

(57) ABSTRACT

A transmission is provided having an input member, an output member, four planetary gear sets, a plurality of coupling members and a plurality of torque-transmitting devices. Further, a hydraulic fluid control circuit is provided for controlling the operation of the plurality of torque-transmitting devices. The hydraulic fluid control circuit receives pressurized hydraulic fluid from an off-axis hydraulic fluid pump and has a plurality of fluid passages disposed in the transmission house, input member and other coupling members.

19 Claims, 3 Drawing Sheets

AUTOMATIC TRANSMISSION GEAR AND CLUTCH ARRANGEMENT

FIELD

The present invention relates generally to multiple speed transmissions having a plurality of planetary gear sets and a plurality of torque-transmitting devices and more particularly to a hydraulic control circuit for controlling the operation of the plurality of torque-transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved control systems is essentially constant. More efficient hydraulic controls require less energy and provide improved performance, weight efficiency and driver satisfaction. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission is provided having a transmission housing including a front portion and a rear portion. The front portion including a first, a second, a third and a fourth apply fluid passages and a first dam fluid passage. The rear portion including a fifth apply fluid passage and a second dam fluid passage. The transmission further includes a first, a second, a third, and a fourth planetary gear sets each having a first, a second, and a third members. The transmission further includes five torque-transmitting mechanisms each having at least an apply chamber, a dam chamber and a piston for selectively interconnecting at least one of the first, second, and third members with at least one other of the first members, second members, third members, and the transmission housing The fifth apply fluid passage is in communication with the first apply chamber of the fifth of the five torque-transmitting mechanisms and the second dam fluid passage is in communication with the dam chamber of the fifth of the five torque-transmitting mechanisms. The transmission further includes an input member continuously interconnected to the second member of the first planetary gear set and defining a longitudinal axis. The input member has a first center bore and a first outer passage coaxial with the longitudinal axis. The center bore is in communication with the first apply fluid passage and the first outer bore is in communication with the third apply fluid passage. The input member further includes a first side bore in communication with the first outer passage and a second side bore in communication with the first dam passage. The first side bore is in communication with the apply chamber of the third of the five torque-transmitting mechanisms and the second side bore is in communication with the dam chamber of the third of the five torque-transmitting mechanisms. The transmission further includes a first interconnecting member continuously interconnecting the first member of the third planetary gear set and the first member of the fourth planetary gear set. The first interconnecting member has a second center bore in communication with the first center bore of the input member, a second outer passage in communication with the second side port of the input member and a third center bore in communication with second outer passage. The second center bore is in communication with the apply chamber of a first of the five torque-transmitting mechanisms and the second outer passage is in communication with the dam chamber of the first of the five torque-transmitting mechanisms. The transmission further includes a second interconnecting member continuously interconnecting the first member of the first planetary gear set with the front portion of the transmission housing, a third interconnecting member continuously interconnecting the third member of the first planetary gear set with the first member of the second planetary gear set, a fourth interconnecting member continuously interconnecting the third member of the second planetary gear set with the second member of the third planetary gear set, a fifth interconnecting member continuously interconnecting the third member of the third planetary gear set with the second member of the fourth planetary gear set. The transmission further includes an output member continuously interconnected to at least one of the second member of the fourth planetary gear set and the third member of the third planetary gear set. The output member has a fourth center bore in communication with the third center bore of the first interconnecting member. The second member of the second planetary gear set includes a third dam fluid passage in communication with the first dam fluid passage of the front portion, the dam chamber of the second of the five torque-transmitting mechanisms and the dam chamber of the fourth of the five torque-transmitting mechanisms, a sixth apply fluid passage in communication with the second apply fluid passage of the front portion and the first apply chamber of the second of the five torque-transmitting mechanisms and a seventh apply fluid passage in communication with the fourth apply fluid passage of the front portion and the first apply chamber of the fourth of the five torque-transmitting mechanisms.

In another aspect of the present invention, the first of the five torque-transmitting mechanisms is selectively engageable to interconnect at least one of the third member of the first planetary gear set and the first member of the second planetary gear set with at least one of the first member of the third planetary gear set and the first member of the fourth planetary gear set. The second of the five torque-transmitting mechanisms is selectively engageable to interconnect the second member of the first planetary gear set with the second member of the second planetary gear set. The third of the five torque-transmitting mechanisms is selectively engageable to interconnect at least one of the input member and the second member of the first planetary gear set with at least one of the first member of the third planetary gear set and the first member of the fourth planetary gear set. The fourth of the five torque-transmitting mechanisms is selectively engageable to interconnect the second member of the second planetary gear set with the third member of the fourth planetary gear set. The fifth of the five torque-transmitting mechanisms is selectively engageable to interconnect the third member of the fourth planetary gear set with the transmission housing.

In yet another aspect of the present invention, the torque-transmitting mechanisms are selectively engageable in combinations of at least two to establish at least eight forward speed ratios and at least one reverse speed ratio between the input member and the output member.

In yet another aspect of the present invention, the transmission further includes a sleeve shaft supported by the front portion of the transmission housing, a plurality of input member pressure seals, a first bearing, a first, a second, and a third annular channel. The annular channels are defined by the inner surface of the sleeve shaft, the outer surface of the input member, and the side surfaces of the plurality of input member pressure seals and the first bearing. The first annular channel communicates with the first apply fluid passage and the first center bore. The second annular channel communicates with the third apply fluid passage and the first outer passage. The third annular channel communicates with the first dam passage and the second side bore.

In yet another aspect of the present invention, the transmission further includes a first and second interconnecting member pressure seals and a fourth annular channel formed by the inner surface of the input member, the outer surface of the first interconnecting member, and the side surfaces of the first and second interconnecting member pressure seals. The fourth annular channel communicates with the second side bore and the second outer passage.

In yet another aspect of the present invention, the transmission further includes a plurality of carrier member seals, a second bearing, a fifth, a sixth and a seventh annular channels formed by the inner surface of the second member of the second planetary gear set, the outer surface of the front portion of the transmission housing, and the side surfaces of the plurality of carrier member pressure seals and the second bearing. The fifth annular channel communicates with the second apply fluid passage and the sixth apply fluid passage. The sixth annular channel communicates with the fourth apply fluid passage and the seventh apply fluid passage. The seventh annular channel communicates with the first dam fluid passage and the third dam fluid passage.

In yet another aspect of the present invention, the second of the five torque-transmitting mechanisms includes a second apply chamber. The second apply chamber of the second of the five torque-transmitting mechanisms communicates with an eighth apply fluid passage of the first portion of the transmission housing through a ninth apply fluid passage disposed in the second member of the second planetary gear set.

In yet another aspect of the present invention, the fourth of the five torque-transmitting mechanisms includes a second piston and a second apply chamber supported by a center portion of the transmission housing. The second apply chamber of the fourth of the five torque-transmitting mechanisms communicates with a tenth apply fluid passage disposed in the transmission housing.

In yet another aspect of the present invention, the fifth of the five torque-transmitting mechanisms includes a second apply chamber. The second apply chamber of the fifth of the five torque-transmitting mechanisms communicates with an eleventh apply fluid passage of the rear portion of the transmission housing.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
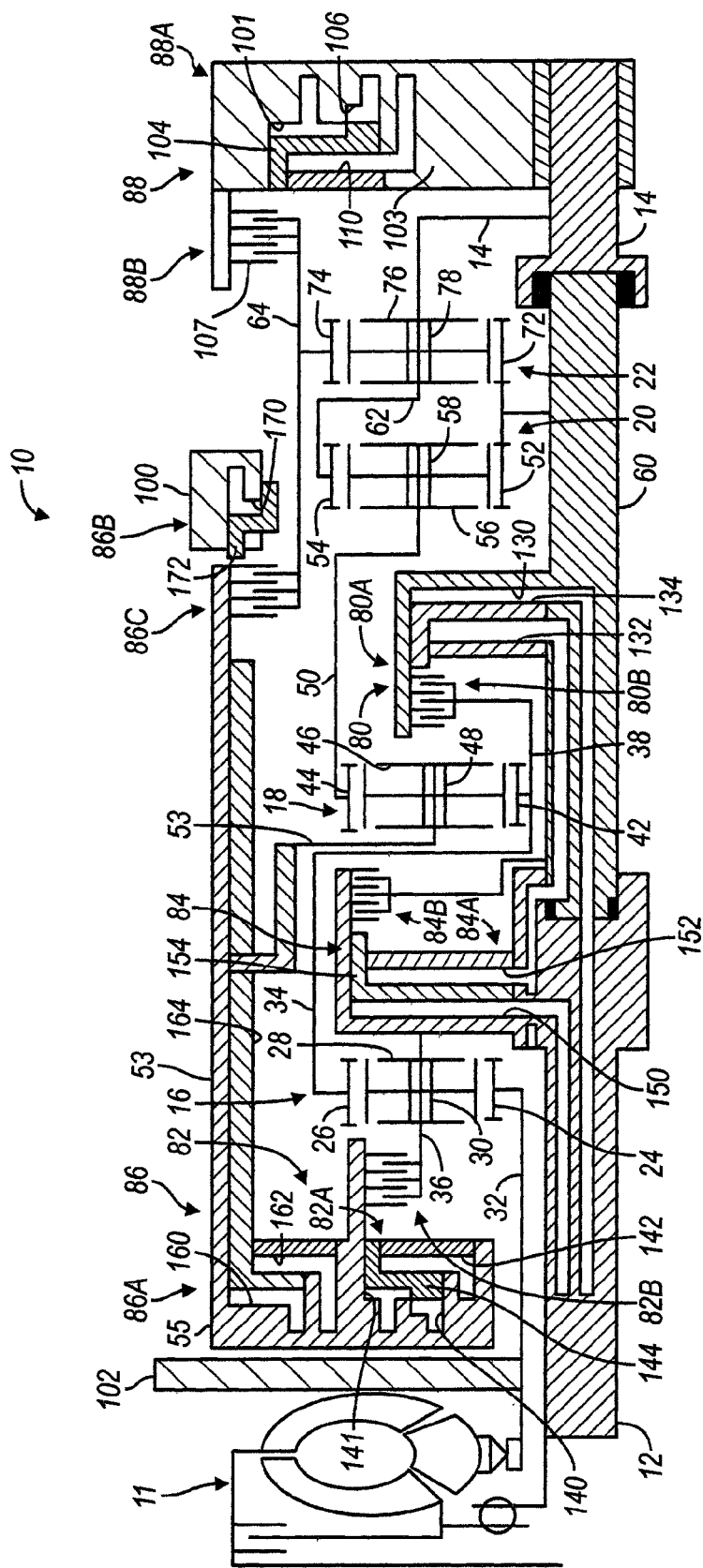
FIG. 1 is a schematic diagram of an embodiment of an eight speed transmission according to the present invention.

Referring to the drawings, wherein like reference numbers refer to like components, in FIG. 1 a multi-speed transmission 10 is illustrated. The transmission 10 includes an input member 12 and an output member 14. In the present embodiment, input member 12 and output member 14 are shafts, and will be referred to as such. Those skilled in the art will appreciate that the input and output members 12, 14 may be components other than shafts. The input shaft 12 is continuously connected to an engine (not shown) or torque converter 11. The output shaft 14 is continuously connected with the final drive unit or transfer case (not shown).

In a preferred embodiment of the present invention, the transmission 10 includes four planetary gear sets 16, 18, 20 and 22 disposed in a transmission housing 100. The planetary gear sets 16, 18, 20 and 22 are connected between the input shaft 12 and the output shaft 14.

More specifically, the first planetary gear set 16 is disposed proximate a front portion 102 of the transmission housing 100. The second planetary gear set 18 is disposed proximate to the first planetary gear set 16. The fourth planetary gear set 22 is disposed adjacent a rear portion 103 of the transmission housing 100. The third planetary gear set 20 is disposed adjacent the fourth planetary gear set 22.

The first planetary gear set 16 includes a sun gear member 24, a ring gear member 26 and a carrier member 28 that rotatably supports a set of pinion gears 30 (only one shown). Sun gear member 24 is connected for common rotation with a first shaft or interconnecting member 32. The first interconnecting member 32 is connected to a transmission housing 100 and, thus, prevents sun gear member 24 from rotating relative to the transmission housing 100. Ring gear member 26 is connected for common rotation with a second shaft or interconnecting member 34. Carrier member 28 is connected for common rotation with a third shaft or interconnecting member 36 and the input member 12. Pinion gears 30 are each configured to intermesh with both sun gear member 24 and ring gear member 26.

The second planetary gear set 18 includes a sun gear member 42, a ring gear member 44 and a carrier member 46 that rotatably supports a set of pinion gears 48. Sun gear member 42 is connected for common rotation with the second shaft or interconnecting member 34 and a fourth shaft or interconnecting member 38. Ring gear member 44 is connected for common rotation with a fifth shaft or interconnecting member 50. Carrier member 46 connected for common rotation with a sixth shaft or interconnecting member 53. Pinion gears 48 are each configured to intermesh with both sun gear member 42 and ring gear member 44.

The third planetary gear set 20 includes a sun gear member 52, a ring gear member 54 and a carrier member 56 that rotatably supports a set of pinion gears 58. Sun gear member 52 is connected for common rotation with a seventh shaft or interconnecting member 60. Ring gear member 54 is connected for common rotation with an eighth shaft or interconnecting member 62. Carrier member 56 is connected for common rotation with the fifth shaft or interconnecting member 50. Pinion gears 58 are each configured to intermesh with both sun gear member 52 and ring gear member 54.

The fourth planetary gear set 22 includes a sun gear member 72, a ring gear member 74 and a carrier member 76 that rotatably supports a set of pinion gears 78. Sun gear member 72 is connected for common rotation with the seventh shaft or interconnecting member 60. Ring gear member 74 is connected for common rotation with a ninth shaft or interconnecting member 64. Carrier member 76 is connected for common rotation with the output shaft 14 and eighth interconnecting member 62. Pinion gears 78 are each configured to intermesh with both sun gear member 72 and ring gear member 74.

The transmission 10 includes a plurality of torque-transmitting mechanisms or devices allowing for selective coupling of shafts or interconnecting members, members of the planetary gear sets and the transmission housing 100. More specifically, transmission 10 includes a first clutch 80, a second clutch 82, a third clutch 84, a fourth clutch 86 and a brake 88. For example, the first clutch 80 is selectively engageable to connect the seventh shaft or interconnecting member 60 to the fourth shaft or interconnecting member 38. The second clutch 82 is selectively engageable to connect the third shaft or interconnecting member 36 to the sixth shaft or interconnecting member 53. The third clutch 84 is selectively engageable to connect the input shaft 12 to the seventh shaft or interconnecting member 60. The fourth clutch 86 is selectively engageable to connect the sixth shaft or interconnecting member 53 to the ninth shaft or interconnecting member 64. The brake 88 is selectively engageable to connect the ninth shaft or interconnecting member 64 to a rear portion 103 of the transmission housing 100 to restrict rotation of the ring gear member 74 relative to the transmission housing 100.

The transmission 10 is capable of transmitting torque from the input shaft 12 to the output shaft 14 in at least eight forward torque ratios and one reverse torque ratio. Each of the forward torque ratios and the reverse torque ratios are attained by engagement of one or more of the torque-transmitting mechanisms (i.e. first clutch 80, second clutch 82, third clutch 84, fourth clutch 86 and brake 88). Those skilled in the art will readily understand that a different speed ratio is associated with each torque ratio. Thus, at least eight forward speed ratios and at least one reverse speed ratio may be attained by the transmission 10.

With continuing reference to FIG. 1, the location of clutches 80, 82, 84, 86 and brake 88 along the input shaft 12 and relative to the planetary gear sets 16, 18, 20, 22 will now be described.

The first, second, third and fourth clutches 80, 82, 84, 86 and brake 88 are arranged coaxially with the input shaft 12. The first clutch 80 is located between the second planetary gear set 18 and the third planetary gear set 20 and supported by the seventh shaft or interconnecting member 60. The second clutch 82 is located between the front portion 102 of the transmission housing 100 and the first planetary gear set 16 and is supported by the sixth shaft or interconnecting member 53. The third clutch 84 is disposed between the first planetary gear set 16 and the second planetary gear set 18 and is supported by the input shaft 12. The fourth clutch 86 is located between the second planetary gear set 18 and the third planetary gear set 20 and is supported by the sixth shaft or interconnecting member 53. The brake 88 is located adjacent the fourth planetary gear set 22 and supported by the rear portion 103 of the transmission housing 100.

The first clutch 80 includes an actuating assembly 80A and a clutch pack 80B. The actuating assembly 80A of the first clutch 80 includes an apply chamber 130, a dam chamber 132 and a piston 134. The actuating assembly 80A is fixed to the seventh shaft or interconnecting member 60. The clutch pack 80B includes a plurality of alternating friction disks or rings. The piston 134 of the actuating assembly 80A engages the clutch pack 80B to force the plurality of alternating friction disks together to interconnect the sun gear 42 of the second planetary gear set 18 and the fourth shaft or interconnecting member 38 with the seventh shaft or interconnecting member 60.

The second clutch 82 includes an actuating assembly 82A and a clutch pack 82B. The actuating assembly 82A of the first clutch 82 includes a first apply chamber 140, a second apply chamber 141, a dam chamber 142 and a piston 144. The actuating assembly 82A is fixed to the sixth shaft or interconnecting member 53. The clutch pack 82B includes a plurality of alternating friction disks or rings. The piston 144 of the actuating assembly 82A engages the clutch pack 82B to interconnect the third shaft or interconnecting member 36 and the sixth shaft or interconnecting member 53.

The third clutch 84 includes an actuating assembly 84A and a clutch pack 84B. The actuating assembly 84A of the third clutch 84 includes an apply chamber 150, a dam chamber 152 and a piston 154. The actuating assembly 84A is supported rigidly by the input shaft 12. The clutch pack 84B includes a plurality of alternating friction disks or rings. The piston 154 of the actuating assembly 84A engages the clutch pack 84B to interconnect the seventh shaft or interconnecting member 60 to the input shaft 12 and the carrier member 28 of the first planetary gear set 16.

Figure 2A:
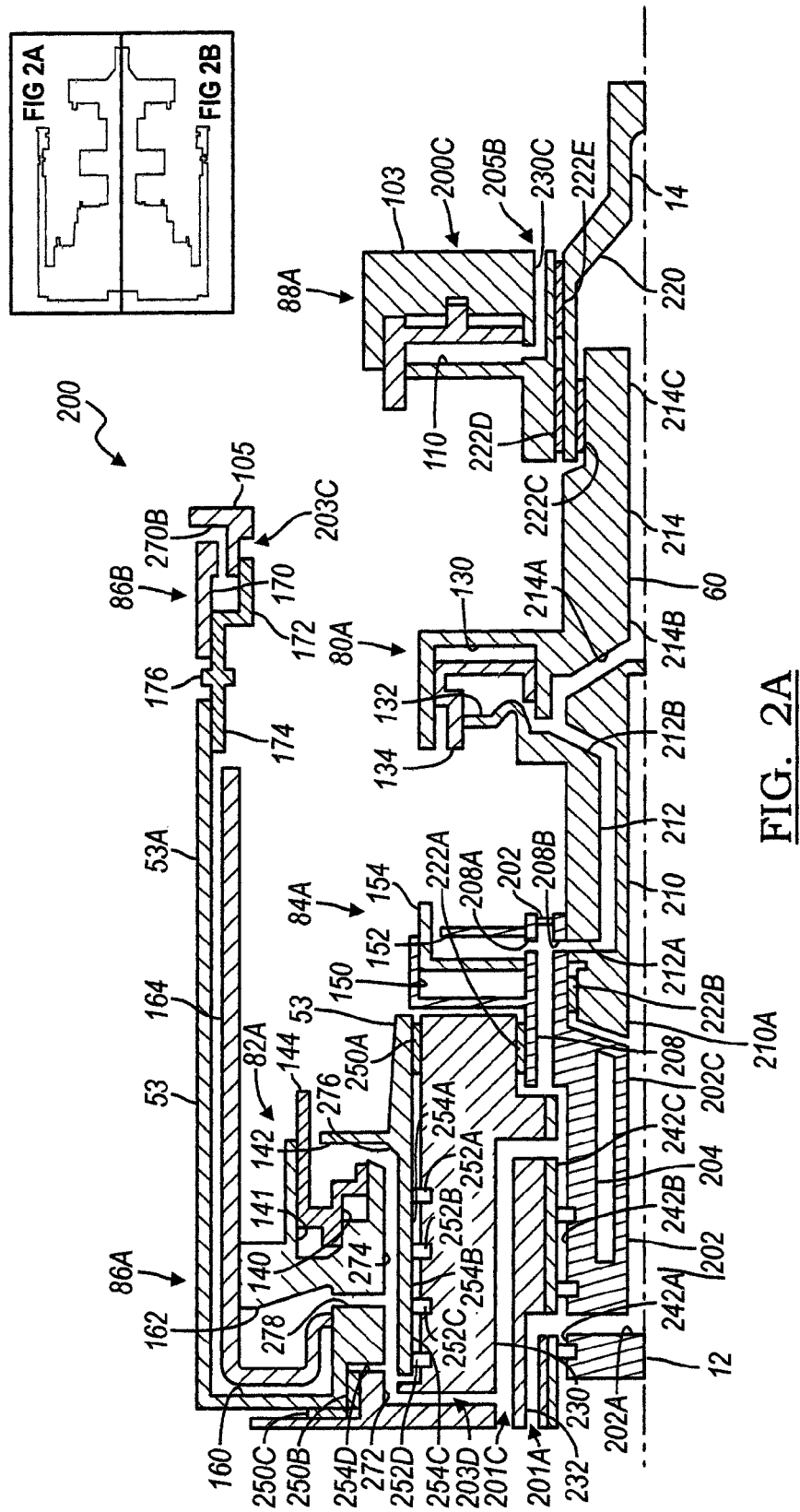
FIGS. 2A and 2B are a cross-section of an input shaft, a shaft or interconnecting member and an output shaft illustrating a fluid routing system for an eight speed transmission in accordance with an embodiment of the present invention.

Turning now to FIG. 2A with continuing reference to FIG. 1, the fourth clutch 86 includes a first actuating assembly 86A, a second actuating assembly 86B, and a clutch pack 86C. The first actuating assembly 86A of the fourth clutch 86 includes an apply chamber 160, a dam chamber 162 and a fingered piston 164. The first actuating assembly 86A is fixed to the sixth shaft or interconnecting member 53. The second actuating assembly 86B includes an apply chamber 170, a first piston 172, a second piston 174 and a thrust bearing 176. The second actuating assembly 86B is supported rigidly by the transmission housing 100. The thrust bearing 176 is disposed between the first piston 172 and the second piston 174 to allow the second piston 174 to rotate relative to the first piston 172 and along with the clutch pack 86C and the sixth shaft or interconnecting member 53 when the first and second pistons 172, 174 are engaged. The clutch pack 86C includes a plurality of alternating friction disks or rings. The pistons of the first actuating assembly 86A and the second actuating assembly 86B engage the clutch pack 86C to interconnect the sixth shaft or interconnecting member 53 with the ninth shaft or interconnecting member 64 and the ring gear 74 of the fourth planetary gear set 22.

The brake 88 includes an actuating assembly 88A and a clutch pack 88B. The actuating assembly 88A of the brake 88 includes a brake piston 104, a first apply chamber 101, a second apply chamber 106, and a dam chamber 110. The clutch pack 88B of the first brake 88 includes a plurality of clutch plates 107 secured to the rear portion 103 of the transmission housing 100. The piston 104 of the actuating assembly 88A engages the clutch pack 88B to interconnect the ninth shaft or interconnecting member 64 with the transmission housing 100.

Figure 2B:
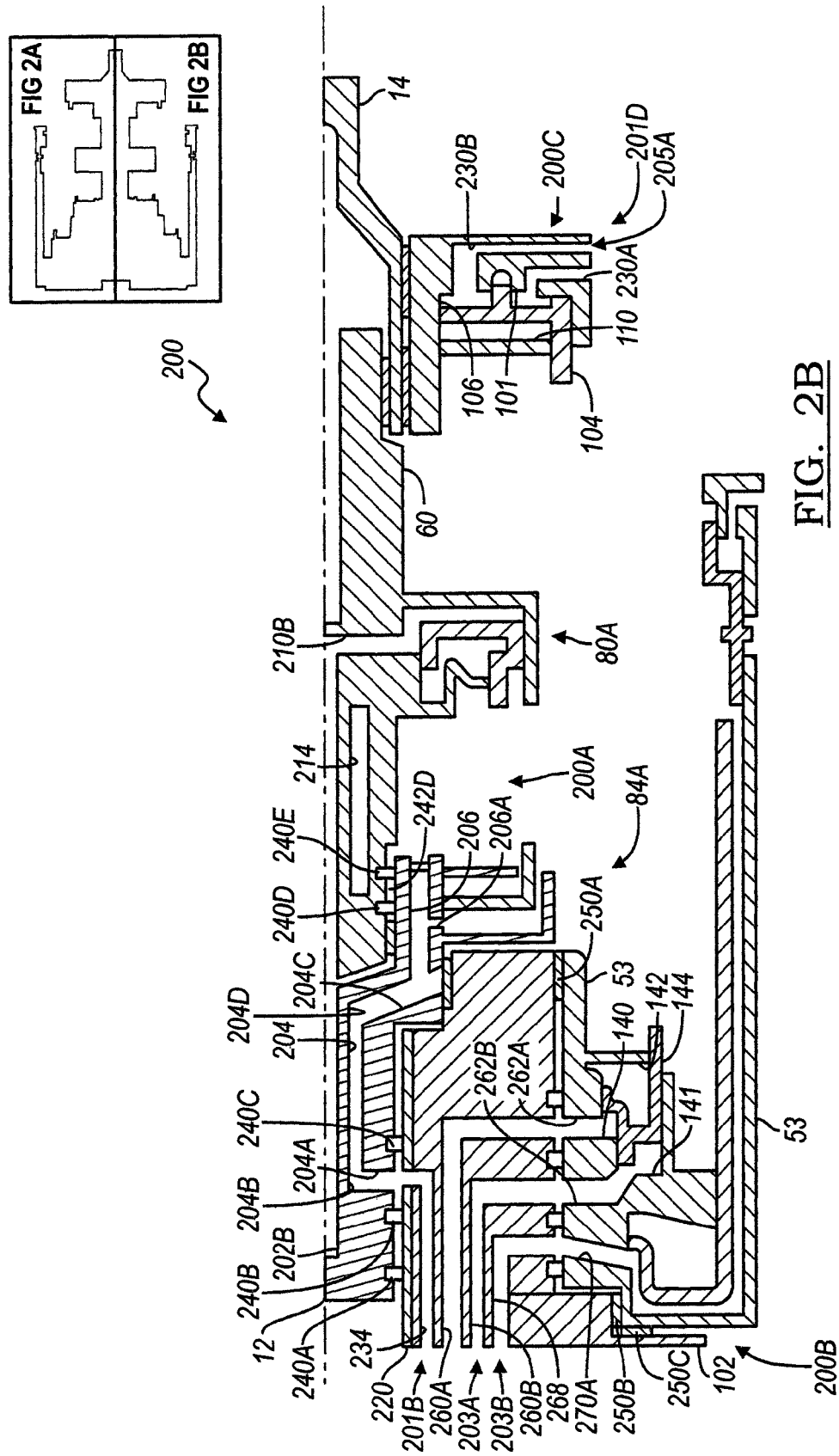

Referring now to FIGS. 2A and 2B, cross-sectional views of the input shaft 12, the seventh shaft or interconnecting member 60 and the output shaft 14 are illustrated. As shown in FIGS. 2A and 2B a hydraulic control circuit 200 is provided having a first portion 200A for controlling the actuation of the clutches 80, 84, a second portion 200B for controlling the actuation of the clutches 82, 86 and a third portion 200C for controlling the actuation of the brake 88 in accordance with an embodiment of the present invention. Hydraulic control circuit 200 contains hydraulic fluid that is pressurized by a hydraulic fluid pump (not shown) and generates hydraulic control signals to actuate the clutches 80, 82, 84, 86 and brake 88 (FIG. 1).

The first portion 200A of the hydraulic control circuit 200 includes an apply circuit 201A of the first clutch 80, an apply circuit 201B of the third clutch 84 and a first dam circuit 201C. The second portion 200B of the hydraulic control circuit 200 includes an apply circuit 203A of the second clutch 82, a first and second apply circuit 203B-C of the fourth clutch 86, and a second dam circuit 203D. The third portion 200C of the hydraulic control circuit 200 includes a brake apply circuit 205A and a brake dam circuit 205B.

The apply circuit 201A of the first clutch 80 is formed by the front portion 102 of the transmission housing 100, the input shaft 12 and the seventh shaft or interconnecting member 60. More specifically, the apply circuit 201A of the first clutch 80 is defined by an apply passage 232 of the first clutch 80 disposed in the front portion 102 of the transmission housing 100, a first center bore 202 disposed in the input shaft 12 and a second center bore 210 disposed in the seventh shaft or interconnecting member 60. The apply passage 232 of the first clutch 80 communicates with the first center bore 202 through a first annular channel 242A and a side port 202A at a first end 202B of the first center bore 202. The first center bore 202 communicates with the second center bore 210 through an open end 210A of the second center bore 210 and an open end 202C opposite the first end 202B of the first center bore 202. The second center bore 210 communicates with the apply chamber 130 of the actuating assembly 80A of the first clutch 80 through a side port 210B opposite the open end 210A of the second center bore 210.

The apply circuit 201B of the third clutch 84 is formed by the front portion 102 of the transmission housing 100 and the input shaft 12. More specifically, the apply circuit 201B of the third clutch 84 is defined by an apply passage 234 of the third clutch 84 disposed in the front portion 102 of the transmission housing 100 and a first outer passage 204 and a first side bore 206 disposed in the input shaft 12. The apply passage 234 of the third clutch 84 communicates with the first outer passage 204 through a second annular channel 242B and a side port 204A at a first end 204B of the first outer passage 204. The first outer passage 204 communicates with the first side bore 206 through a side port 204C at a second end 204D opposite the first end 204B of the first outer passage 204. The first side bore 206 communicates with the apply chamber 150 of the actuating assembly 84A of the third clutch 84 through a side port 206A.

The first dam circuit 201C is formed by the front portion 102 of the transmission housing 100, the input shaft 12 and the seventh shaft or interconnecting member 60. More specifically, the first dam circuit is defined by a first dam passage 230 disposed in the front portion 102, a second side bore 208 disposed in the input shaft 12 and a second outer passage 212 and a third and fourth center bore 214 disposed in the seventh shaft or interconnecting member 60. The first dam passage 230 communicates with the second side bore 208 through a third annular channel 242C. The second side bore 208 of the input shaft 12 communicates with the dam chamber 152 of the actuating assembly 84A of the third clutch 84 through a side port 208A. The second side bore 208 also communicates with the second outer passage 212 of the seventh shaft or interconnecting member 60 through a side port 208B, a fourth annular channel 242D and a side port 212A. The second outer passage 212 communicates with the dam chamber 132 of the actuating assembly 80A of the first clutch 80 through a side port 212B. The third center bore 214 communicates with the side port 212B through side port 214A at a first end 214B of the third center bore 214. The third center bore 214 of the seventh shaft or interconnecting member 60 further communicates through an open end 214C opposite the first end 214B with a fourth center bore 220 of the output shaft 14. Additionally, a plurality of side ports (not shown) are disposed in the seventh shaft or interconnecting member 60 and the output shaft 14. The side ports allow pressurized hydraulic fluid to flow from the third center bore 214 of the seventh shaft or interconnecting member 60 and the fourth center bore 220 of the output shaft 14 to various bearings and shaft support mechanisms in the transmission.

The apply circuit 203A of the second clutch 82 is formed by the front portion 102 of the transmission housing 100 and the sixth shaft or interconnecting member 53. More specifically, the apply circuit 203A of the second clutch 82 is defined by a first and second apply passages 260A-B of the second clutch 82 disposed in the front portion 102 of the transmission housing 100 and a first and second apply passages 262A-B of the second clutch 82 disposed in the sixth shaft or interconnecting member 53. The first apply passage 260A of the second clutch 82 of the first portion 102 communicates with the first apply passage 262A of the second clutch 82 of the sixth shaft or interconnecting member 53 through a fifth annular channel 254A. The first apply passage 262A of the second clutch 82 of the sixth shaft or interconnecting member 53 communicates with the first apply chamber 140 of the actuating assembly 82A of the second clutch 82. The second apply passage 260B of the second clutch 82 of the first portion 102 communicates with the second apply passage 260B of the second clutch 82 of the sixth shaft or interconnecting member 53 through a sixth annular channel 254B. The second apply passage 260B of the second clutch 82 communicates with the second apply chamber 141 of the actuating assembly 82A of the second clutch 82.

The first apply circuit 203B of the fourth clutch 86 is formed by the front portion 102 of the transmission housing 100 and the sixth shaft or interconnecting member 53. More specifically, the first apply circuit 203B of the fourth clutch 86 includes an apply passage 268 of the fourth clutch 86 disposed in the front portion 102 of the transmission housing 100 and an apply passage 270A of the fourth clutch 86 disposed in the sixth shaft or interconnecting member 53. The apply passage 268 of the fourth clutch 86 communicates with the apply passage 270A of the fourth clutch 86 through a seventh annular channel 254C. The apply passage 270A of the fourth clutch 86 communicates with the apply chamber 160 of the first actuating assembly 86A of the fourth clutch 86.

The second apply circuit 203C of the fourth clutch 86 is formed in a center portion 105 of the transmission housing 100. More specifically, the second apply circuit 203B of the fourth clutch 86 includes a second apply passage 270B of the fourth clutch 86. The second apply passage 270B of the fourth clutch 86 communicates with the apply chamber 170 of the second actuating assembly 86B of the fourth clutch 86.

The second dam circuit 203D is formed by the front portion 102 of the transmission housing 100 and the sixth shaft or interconnecting member 53. More specifically, the second dam circuit 203D includes a second dam passage 272 disposed in the front portion 102 of the transmission housing 100 and a dam passage 274 disposed in the sixth shaft or interconnecting member 53. The second dam passage 272 communicates with the dam passage 274 through an eighth annular channel 254D. The dam passage 274 of the sixth shaft or interconnecting member 53 communicates with the dam chamber 142 of the second clutch 82 through a first dam port 276. The dam passage 274 of the sixth shaft or interconnecting member 53 communicates with the dam chamber 162 of the fourth clutch 86 through a second dam port 278.

The brake circuit 201D is formed by the rear portion 104 of the transmission housing. More specifically, the brake circuit is defined by a first and a second brake apply passages 230A-B and a brake dam passage 230C disposed in the rear portion 104 of the transmission housing 100. The first brake apply passage 230A communicates with the first apply chamber 101 of the actuating assembly 88A of the brake 88. The second brake apply passage 230B communicates with the second apply chamber 106 of the actuating assembly 88A of the brake 88. The brake dam passage 230C communicates with the dam chamber 110 of the actuating assembly 88A of the brake 88.

With continuing reference to FIGS. 2A AND 2B, the annular channels 242A-C of the first portion 200A of the hydraulic control circuit 200 are described in further detail. The annular channels 242A-C are formed by the input shaft 12, a sleeve shaft 220, a bearing 222A and a plurality of pressure seals 240A-C. More specifically, the sleeve shaft 220 is fixedly disposed in the front portion 102 of the transmission housing 100. The pressure seals 240A-C are disposed between the input shaft 12 and the sleeve shaft 220. The first annular channel 242A is defined by the outer surface of the input shaft 12, the inner surface of the sleeve shaft 220 and the side surfaces of the first pressure seal 240A and the second pressure seal 240B. The second annular channel 242B is defined by the outer surface of the input shaft 12, the inner surface of a sleeve shaft 220 and the side surfaces of the second pressure seal 240B and the third pressure seal 240C. The third annular channel 242C is defined by the outer surface of the input shaft 12, the inner surface of a sleeve shaft 220 and the side surfaces of the bearing 222A and the third pressure seal 240C.

The first portion 200A of the hydraulic control circuit 200 further includes the fourth annular channel 242D. The fourth annular channel 242D is formed by the input shaft 12, the seventh shaft and interconnecting member 60 and a fourth and fifth pressure seals 240D-E. More specifically, the fourth and fifth pressure seals 240D-E are disposed between the input shaft 12 and the seventh shaft or interconnecting member 60. The fourth annular channel 242D is defined by the inner surface of the input shaft 12, the outer surface of the seventh shaft or interconnecting member 60, and the sided surfaces of the fourth and fifth pressure seals 240D-E.

The annular channels 254A-D of the second portion 200B of the hydraulic control circuit 200 are now described in further detail. The annular channels 254A-D are formed by the first portion 102 of the transmission housing 100, the sixth shaft or interconnecting member 53, a bearing 250B and a plurality of pressure seals 252A-D. More specifically, the pressure seals 252A-D are disposed between the first portion 102 of the transmission housing 100 and the sixth shaft or interconnecting member 53. The fifth annular channel 254A is defined by the outer surface of the front portion 102, the inner surface of the sixth shaft or interconnecting member 53 and the side surfaces of the sixth pressure seal 252A and a seventh pressure seal 252B. The sixth annular channel 254B is defined by the outer surface of the front portion 102, the inner surface of the sixth shaft or interconnecting member 53 and the side surfaces of the seventh pressure seal 252B and a eighth pressure seal 252C. The seventh annular channel 254C is defined by the outer surface of the front portion 102, the inner surface of the sixth shaft or interconnecting member 53 and the side surfaces of the eighth pressure seal 252C and a ninth pressure seal 252D. The eighth annular channel 254D is defined by the outer surface of the front portion 102, the inner surface of the sixth shaft or interconnecting member 53 and the side surfaces of the bearing 250B and the tenth pressure seal 252D.

The description of the invention is merely exemplary in nature and variations that do not depart from the gist of the invention are intended to be within the scope of the invention. Such variations are not to be regarded as a departure from the spirit and scope of the invention.

What is claimed is:

1. A multi-speed transmission comprising:
a transmission housing having a front portion and a rear portion, the front portion including a first, a second, a third and a fourth apply fluid passages and a first dam fluid passage and the rear portion including a fifth apply fluid passage and a second dam fluid passage and;
a first, a second, a third, and a fourth planetary gear sets each having a first, a second, and a third members;
five torque-transmitting mechanisms each having at least an apply chamber, a dam chamber and a piston for selectively interconnecting at least one of the first, second, and third members with at least one other of the first members, second members, third members, and the transmission housing, and wherein the fifth apply fluid passage is in communication with the first apply chamber of the fifth of the five torque-transmitting mechanisms and the second dam fluid passage is in communication with the dam chamber of the fifth of the five torque-transmitting mechanisms;
an input member continuously interconnected to the second member of the first planetary gear set and defining a longitudinal axis, the input member having:
a first center bore and a first outer passage coaxial with the longitudinal axis, wherein the center bore is in communication with the first apply fluid passage and the first outer bore is in communication with the third apply fluid passage;
a first side bore in communication with the first outer passage;
a second side bore in communication with the first dam passage;
wherein the first side bore is in communication with the apply chamber of the third of the five torque-transmitting mechanisms and the second side bore is in communication with the dam chamber of the third of the five torque-transmitting mechanisms; and
a first interconnecting member continuously interconnecting the first member of the third planetary gear set and the first member of the fourth planetary gear set, the first interconnecting member having:
a second center bore in communication with the first center bore of the input member;
a second outer passage in communication with the second side port of the input member; and
a third center bore in communication with second outer passage; and
wherein the second center bore is in communication with the apply chamber of a first of the five torque-transmitting mechanisms and the second outer passage is in communication with the dam chamber of the first of the five torque-transmitting mechanisms;
a second interconnecting member continuously interconnecting the first member of the first planetary gear set with the front portion of the transmission housing;

a third interconnecting member continuously interconnecting the third member of the first planetary gear set with the first member of the second planetary gear set;
a fourth interconnecting member continuously interconnecting the third member of the second planetary gear set with the second member of the third planetary gear set;
a fifth interconnecting member continuously interconnecting the third member of the third planetary gear set with the second member of the fourth planetary gear set; and
an output member continuously interconnected to at least one of the second member of the fourth planetary gear set and the third member of the third planetary gear set, the output member having a fourth center bore in communication with the third center bore of the first interconnecting member; and
wherein the second member of the second planetary gear set includes:
a third dam fluid passage in communication with the first dam fluid passage of the front portion, the dam chamber of the second of the five torque-transmitting mechanisms and the dam chamber of the fourth of the five torque-transmitting mechanisms;
a sixth apply fluid passage in communication with the second apply fluid passage of the front portion and the first apply chamber of the second of the five torque-transmitting mechanisms;
a seventh apply fluid passage in communication with the fourth apply fluid passage of the front portion and the first apply chamber of the fourth of the five torque-transmitting mechanisms.

2. The multi-speed transmission of claim 1 wherein;
the first of the five torque-transmitting mechanisms is selectively engageable to interconnect at least one of the third member of the first planetary gear set and the first member of the second planetary gear set with at least one of the first member of the third planetary gear set and the first member of the fourth planetary gear set;
the second of the five torque-transmitting mechanisms is selectively engageable to interconnect the second member of the first planetary gear set with the second member of the second planetary gear set;
the third of the five torque-transmitting mechanisms is selectively engageable to interconnect at least one of the input member and the second member of the first planetary gear set with at least one of the first member of the third planetary gear set and the first member of the fourth planetary gear set;
the fourth of the five torque-transmitting mechanisms is selectively engageable to interconnect the second member of the second planetary gear set with the third member of the fourth planetary gear set; and
the fifth of the five torque-transmitting mechanisms is selectively engageable to interconnect the third member of the fourth planetary gear set with the transmission housing.

3. The multi-speed transmission of claim 1 further wherein the torque-transmitting mechanisms are selectively engageable in combinations of at least two to establish at least eight forward speed ratios and at least one reverse speed ratio between the input member and the output member.

4. The multi-speed transmission of claim 1 further comprising:
a sleeve shaft supported by the front portion of the transmission housing;
a plurality of input member pressure seals;
a first bearing; and
a first, second, and third annular channel wherein the annular channels are defined by the inner surface of the sleeve shaft, the outer surface of the input member, and the side surfaces of the plurality of input member pressure seals and the first bearing, and
wherein the first annular channel communicates with the first apply fluid passage and the first center bore, the second annular channel communicates with the third apply fluid passage and the first outer passage, and the third annular channel communicates with the first dam passage and the second side bore.

5. The multi-speed transmission of claim 4 further comprising:
a first and second interconnecting member pressure seals; and
a fourth annular channel formed by the inner surface of the input member, the outer surface of the first interconnecting member, and the side surfaces of the first and second interconnecting member pressure seals; and
wherein the fourth annular channel communicates with the second side bore and the second outer passage.

6. The multi-speed transmission of claim 5 further comprising:
a plurality of carrier member seals;
a second bearing; and
a fifth, sixth and seventh annular channels formed by the inner surface of the second member of the second planetary gear set, the outer surface of the front portion of the transmission housing, and the side surfaces of the plurality of carrier member pressure seals and the second bearing; and
wherein the fifth annular channel communicates with the second apply fluid passage and the sixth apply fluid passage, the sixth annular channel communicates with the fourth apply fluid passage and the seventh apply fluid passage, and the seventh annular channel communicates with the first dam fluid passage and the third dam fluid passage.

7. The multi-speed transmission of claim 1 wherein the second of the five torque-transmitting mechanisms includes a second apply chamber, and wherein the second apply chamber of the second of the five torque-transmitting mechanisms communicates with an eighth apply fluid passage of the first portion of the transmission housing through a ninth apply fluid passage disposed in the second member of the second planetary gear set.

8. The multi-speed transmission of claim 1 wherein the fourth of the five torque-transmitting mechanisms includes a second piston and a second apply chamber supported by a center portion of the transmission housing, and wherein the second apply chamber of the fourth of the five torque-transmitting mechanisms communicates with a tenth apply fluid passage disposed in the transmission housing.

9. The multi-speed transmission of claim 1 wherein the fifth of the five torque-transmitting mechanisms includes a second apply chamber, and wherein the second apply chamber of the fifth of the five torque-transmitting mechanisms communicates with an eleventh apply fluid passage of the rear portion of the transmission housing.

10. A multi-speed transmission comprising:
a transmission housing having a front portion and a rear portion, the front portion including a first, a second, a third and a fourth apply fluid passages and a first dam fluid passage and the rear portion including a fifth apply fluid passage and a second dam fluid passage and;
a first, a second, a third, and a fourth planetary gear sets each having a first, a second, and a third members;

five torque-transmitting mechanisms each having at least an apply chamber, a dam chamber and a piston for selectively interconnecting at least one of the first, second, and third members with at least one other of the first members, second members, third members, and the transmission housing; wherein:

the first of the five torque-transmitting mechanisms is selectively engageable to interconnect at least one of the third member of the first planetary gear set and the first member of the second planetary gear set with at least one of the first member of the third planetary gear set and the first member of the fourth planetary gear set;

the second of the five torque-transmitting mechanisms is selectively engageable to interconnect the second member of the first planetary gear set with the second member of the second planetary gear set;

the third of the five torque-transmitting mechanisms is selectively engageable to interconnect at least one of the input member and the second member of the first planetary gear set with at least one of the first member of the third planetary gear set and the first member of the fourth planetary gear set;

the fourth of the five torque-transmitting mechanisms is selectively engageable to interconnect the second member of the second planetary gear set with the third member of the fourth planetary gear set; and the fifth of the five torque-transmitting mechanisms is selectively engageable to interconnect the third member of the fourth planetary gear set with the transmission housing; and wherein the fifth apply fluid passage is in communication with the first apply chamber of the fifth of the five torque-transmitting mechanisms and the second dam fluid passage is in communication with the dam chamber of the fifth of the five torque-transmitting mechanisms;

an input member continuously interconnected to the second member of the first planetary gear set and defining a longitudinal axis, the input member having:
  a first center bore and a first outer passage coaxial with the longitudinal axis, wherein the center bore is in communication with the first apply fluid passage and the first outer bore is in communication with the third apply fluid passage;
  a first side bore in communication with the first outer passage;
  a second side bore in communication with the first dam passage;
  wherein the first side bore is in communication with the apply chamber of the third of the five torque-transmitting mechanisms and the second side bore is in communication with the dam chamber of the third of the five torque-transmitting mechanisms; and a first interconnecting member continuously interconnecting the first member of the third planetary gear set and the first member of the fourth planetary gear set, the first interconnecting member having:
  a second center bore in communication with the first center bore of the input member;
  a second outer passage in communication with the second side port of the input member; and
  a third center bore in communication with second outer passage; and
  wherein the second center bore is in communication with the apply chamber of a first of the five torque-transmitting mechanisms and the second outer passage is in communication with the dam chamber of the first of the five torque-transmitting mechanisms;

a second interconnecting member continuously interconnecting the first member of the first planetary gear set with the front portion of the transmission housing;

a third interconnecting member continuously interconnecting the third member of the first planetary gear set with the first member of the second planetary gear set;

a fourth interconnecting member continuously interconnecting the third member of the second planetary gear set with the second member of the third planetary gear set;

a fifth interconnecting member continuously interconnecting the third member of the third planetary gear set with the second member of the fourth planetary gear set; and an output member continuously interconnected to at least one of the second member of the fourth planetary gear set and the third member of the third planetary gear set, the output member having a fourth center bore in communication with the third center bore of the first interconnecting member; and wherein the second member of the second planetary gear set includes:
  a third dam fluid passage in communication with the first dam fluid passage of the front portion, the dam chamber of the second of the five torque-transmitting mechanisms and the dam chamber of the fourth of the five torque-transmitting mechanisms;
  a sixth apply fluid passage in communication with the second apply fluid passage of the front portion and the first apply chamber of the second of the five torque-transmitting mechanisms;
  a seventh apply fluid passage in communication with the fourth apply fluid passage of the front portion and the first apply chamber of the fourth of the five torque-transmitting mechanisms.

11. The multi-speed transmission of claim 10 further wherein the torque-transmitting mechanisms are selectively engageable in combinations of at least two to establish at least eight forward speed ratios and at least one reverse speed ratio between the input member and the output member.

12. The multi-speed transmission of claim 10 further comprising:
  a sleeve shaft supported by the front portion of the transmission housing;
  a plurality of input member pressure seals;
  a first bearing; and
  a first, second, and third annular channel wherein the annular channels are defined by the inner surface of the sleeve shaft, the outer surface of the input member, and the side surfaces of the plurality of input member pressure seals and the first bearing, and
  wherein the first annular channel communicates with the first apply fluid passage and the first center bore, the second annular channel communicates with the third apply fluid passage and the first outer passage, and the third annular channel communicates with the first dam passage and the second side bore.

13. The multi-speed transmission of claim 10 further comprising:
  a first and second interconnecting member pressure seals; and
  a fourth annular channel formed by the inner surface of the input member, the outer surface of the first interconnecting member, and the side surfaces of the first and second interconnecting member pressure seals; and wherein the fourth annular channel communicates with the second side bore and the second outer passage.

14. The multi-speed transmission of claim 10 further comprising:
a plurality of carrier member seals;
a second bearing; and
a fifth, sixth and seventh annular channels formed by the inner surface of the second member of the second planetary gear set, the outer surface of the front portion of the transmission housing, and the side surfaces of the plurality of carrier member pressure seals and the second bearing; and
wherein the fifth annular channel communicates with the second apply fluid passage and the sixth apply fluid passage, the sixth annular channel communicates with the fourth apply fluid passage and the seventh apply fluid passage, and the seventh annular channel communicates with the first dam fluid passage and the third dam fluid passage.

15. The multi-speed transmission of claim 10 wherein the second of the five torque-transmitting mechanisms includes a second apply chamber, and wherein the second apply chamber of the second of the five torque-transmitting mechanisms communicates with an eighth apply fluid passage of the first portion of the transmission housing through a ninth apply fluid passage disposed in the second member of the second planetary gear set.

16. The multi-speed transmission of claim 10 wherein the fourth of the five torque-transmitting mechanisms includes a second piston and a second apply chamber supported by a center portion of the transmission housing, and wherein the second apply chamber of the fourth of the five torque-transmitting mechanisms communicates with a tenth apply fluid passage disposed in the transmission housing.

17. The multi-speed transmission of claim 10 wherein the fifth of the five torque-transmitting mechanisms includes a second apply chamber, and wherein the second apply chamber of the fifth of the five torque-transmitting mechanisms communicates with an eleventh apply fluid passage of the rear portion of the transmission housing.

18. A multi-speed transmission comprising:
a transmission housing having a front portion, a center portion and a rear portion, the front portion including a first, a second, a third and a fourth apply fluid passages and a first dam fluid passage and the rear portion including a fifth apply fluid passage and a second dam fluid passage and;
a first, a second, a third, and a fourth planetary gear sets each having a first, a second, and a third members;
five torque-transmitting mechanisms each having at least an apply chamber, a dam chamber and a piston for selectively interconnecting at least one of the first, second, and third members with at least one other of the first members, second members, third members, and the transmission housing; wherein:
the first of the five torque-transmitting mechanisms is selectively engageable to interconnect at least one of the third member of the first planetary gear set and the first member of the second planetary gear set with at least one of the first member of the third planetary gear set and the first member of the fourth planetary gear set;
the second of the five torque-transmitting mechanisms is selectively engageable to interconnect the second member of the first planetary gear set with the second member of the second planetary gear set;
the third of the five torque-transmitting mechanisms is selectively engageable to interconnect at least one of the input member and the second member of the first planetary gear set with at least one of the first member of the third planetary gear set and the first member of the fourth planetary gear set;
the fourth of the five torque-transmitting mechanisms is selectively engageable to interconnect the second member of the second planetary gear set with the third member of the fourth planetary gear set; and
the fifth of the five torque-transmitting mechanisms is selectively engageable to interconnect the third member of the fourth planetary gear set with the transmission housing; and
wherein the fifth apply fluid passage is in communication with the first apply chamber of the fifth of the five torque-transmitting mechanisms and the second dam fluid passage is in communication with the dam chamber of the fifth of the five torque-transmitting mechanisms;
an input member continuously interconnected to the second member of the first planetary gear set and defining a longitudinal axis, the input member having:
a first center bore and a first outer passage coaxial with the longitudinal axis, wherein the center bore is in communication with the first apply fluid passage and the first outer bore is in communication with the third apply fluid passage;
a first side bore in communication with the first outer passage;
a second side bore in communication with the first dam passage;
wherein the first side bore is in communication with the apply chamber of the third of the five torque-transmitting mechanisms and the second side bore is in communication with the dam chamber of the third of the five torque-transmitting mechanisms; and
a first interconnecting member continuously interconnecting the first member of the third planetary gear set and the first member of the fourth planetary gear set, the first interconnecting member having:
a second center bore in communication with the first center bore of the input member;
a second outer passage in communication with the second side port of the input member; and
a third center bore in communication with second outer passage; and
wherein the second center bore is in communication with the apply chamber of a first of the five torque-transmitting mechanisms and the second outer passage is in communication with the dam chamber of the first of the five torque-transmitting mechanisms;
a second interconnecting member continuously interconnecting the first member of the first planetary gear set with the front portion of the transmission housing;
a third interconnecting member continuously interconnecting the third member of the first planetary gear set with the first member of the second planetary gear set;
a fourth interconnecting member continuously interconnecting the third member of the second planetary gear set with the second member of the third planetary gear set;
a fifth interconnecting member continuously interconnecting the third member of the third planetary gear set with the second member of the fourth planetary gear set; and
an output member continuously interconnected to at least one of the second member of the fourth planetary gear set and the third member of the third planetary gear set, the output member having a fourth center bore in communication with the third center bore of the first interconnecting member; and wherein the second member of the second planetary gear set includes:
- a third dam fluid passage in communication with the first dam fluid passage of the front portion, the dam chamber of the second of the five torque-transmitting mechanisms and the dam chamber of the fourth of the five torque-transmitting mechanisms;
- a sixth apply fluid passage in communication with the second apply fluid passage of the front portion and the first apply chamber of the second of the five torque-transmitting mechanisms;
- a seventh apply fluid passage in communication with the fourth apply fluid passage of the front portion and the first apply chamber of the fourth of the five torque-transmitting mechanisms; and wherein the first portion of the transmission housing includes an eighth apply fluid passage that communicates through a ninth apply fluid passage disposed in the second member of the second planetary gear set with a second apply chamber of the second of the five torque-transmitting mechanisms;

the center portion of the transmission housing includes a tenth apply fluid passage that communicates with a second apply chamber of the fourth of the five torque-transmitting mechanisms; and the rear portion of the transmission housing includes an eleventh apply fluid passage that communicates with a second apply chamber of the fifth of the five torque-transmitting mechanisms.

19. The multi-speed transmission of claim 18 further wherein the torque-transmitting mechanisms are selectively engageable in combinations of at least two to establish at least eight forward speed ratios and at least one reverse speed ratio between the input member and the output member.

\* \* \* \* \*